US012315474B2

(12) United States Patent
Ichikawa et al.

(10) Patent No.: US 12,315,474 B2
(45) Date of Patent: May 27, 2025

(54) KEYBOARD INSTRUMENT

(71) Applicant: CASIO COMPUTER CO., LTD., Tokyo (JP)

(72) Inventors: Kenzo Ichikawa, Tokyo (JP); Takahiro Mizushina, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 89 days.

(21) Appl. No.: 18/203,706

(22) Filed: May 31, 2023

(65) Prior Publication Data

US 2023/0306932 A1 Sep. 28, 2023

Related U.S. Application Data

(63) Continuation of application No. PCT/JP2021/042896, filed on Nov. 24, 2021.

(30) Foreign Application Priority Data

Dec. 3, 2020 (JP) ................................ 2020-201215

(51) Int. Cl.
*G10H 1/34* (2006.01)
*G10C 3/12* (2006.01)

(52) U.S. Cl.
CPC ............... *G10C 3/12* (2013.01); *G10H 1/344* (2013.01)

(58) Field of Classification Search
CPC ................................. G10H 1/344; G10C 3/12
See application file for complete search history.

(56) References Cited

U.S. PATENT DOCUMENTS

| | | | | |
|---|---|---|---|---|
| 10,847,130 | B2 * | 11/2020 | Terai | G10H 1/346 |
| 11,017,749 | B2 * | 5/2021 | Tsuzuku | G10C 3/12 |
| 12,136,403 | B2 * | 11/2024 | Yamaguchi | G10C 3/12 |
| 2022/0310050 | A1 * | 9/2022 | Yamaguchi | G10C 3/12 |
| 2024/0153476 | A1 * | 5/2024 | Ichikawa | G10H 1/346 |
| 2024/0153477 | A1 * | 5/2024 | Ichikawa | G10C 3/12 |
| 2024/0428764 | A1 * | 12/2024 | Sawada | G10H 1/346 |

FOREIGN PATENT DOCUMENTS

| | | | | |
|---|---|---|---|---|
| JP | 2019053107 | A | | 4/2019 |
| JP | 2019056781 | A | * | 4/2019 |
| JP | 2020052391 | A | | 4/2020 |

* cited by examiner

*Primary Examiner* — Robert W Horn
(74) *Attorney, Agent, or Firm* — Holtz, Holtz & Volek PC

(57) ABSTRACT

A keyboard instrument has a first member having a first fixation fulcrum, a first link rotatably fixed to the first fixation fulcrum at one end side thereof, a second member having a second fixation fulcrum provided further forwards and downwards than the first fixation fulcrum, a second link rotatably fixed to the second fixation fulcrum at one end side thereof, and a coupling link fixed to a key so as to couple the other end side of the first link and the other end side of the second link together.

8 Claims, 8 Drawing Sheets

KEYBOARD INSTRUMENT

CROSS-REFERENCE TO RELATED APPLICATION

This patent application is based upon and claims the benefit of priority under 35 USC 119 of Japanese Patent Application No. 2020-201215 filed on Dec. 3, 2020, the entire disclosure of which, including the specification, claims, drawings and abstract, is incorporated herein by reference in its entirety.

BACKGROUND

Technical Field

The present disclosure relates to a keyboard instrument.

Description of the Related Art

There have conventionally been provided keyboard instruments which are configured smaller in size than a grand piano while a dynamic characteristic of a key is attempted to approximate to that of the grand piano as possible. For example, Japanese Unexamined Patent Application Publication No. 2020-52391 (JP-A-2020-52391) discloses a keyboard instrument in which a link mechanism is connected to a key. The link mechanism of the disclosed keyboard instrument has a front support and a back support which are disposed on a base, a front key link bar and a back key link bar which are coupled, respectively, to a front portion and a back portion of a key, a front coupling link bar which is coupled to the front key link bar and the front support, and a back coupling link bar which is coupled to the back key link bar, the back support, and the front coupling link bar. The front coupling link bar and the back coupling link bar are coupled to each other rotatably and slidably.

SUMMARY

According to an aspect of the present disclosure, there is provided a keyboard instrument having a first member having a first fixation fulcrum, a first link pivotally supported on the first fixation fulcrum at one end side thereof, a second member having a second fixation fulcrum provided further forwards and downwards than the first fixation fulcrum, a second link pivotally supported on the second fixation fulcrum at one end side thereof, and a coupling link configured to fix the other end side of the first link which is configured to rotate about the first fixation fulcrum in response to a key operation and the other end side of the second link which is configured to rotate about the second fixation fulcrum in response to the key operation so that a distance stays unchanged which is defined between the other end side of the first link and the other end side of the second link.

BRIEF DESCRIPTION OF THE DRAWINGS

FIGS. 7A and 7B are explanatory diagrams illustrating how to obtain loci of a point P and a point Q of the key of the keyboard instrument according to the embodiment of the present disclosure using an xy coordinate system, in which FIG. 7A is a diagram illustrating how to represent a point B and a point C using an xy coordinate system, and FIG. 7B is a diagram illustrating how to represent a point P using an xy coordinate system; and FIGS. 8A and 8B are explanatory diagrams illustrating how to obtain loci of the point P and the point Q of the key of the keyboard instrument according to the embodiment of the present disclosure using an xy coordinate system, in which FIG. 8A is a diagram illustrating how to represent the point Q using an xy coordinate system, and FIG. 8B is a diagram illustrating how to represent loci of the point P, the point Q, the point B, and the point C using an xy coordinate system.

DESCRIPTION OF THE EMBODIMENT

Figure 1:
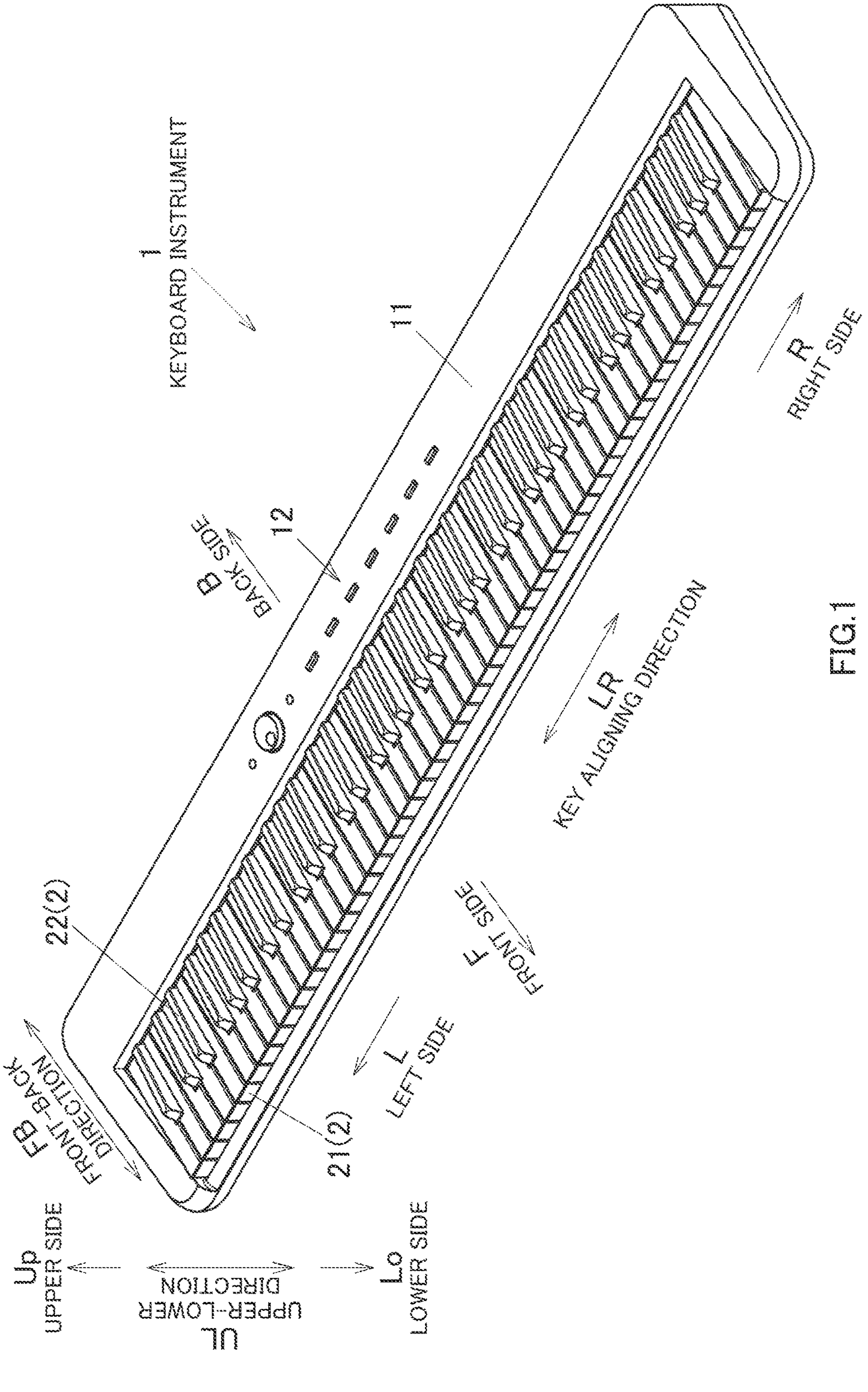
FIG. 1 is an overall perspective view of a keyboard instrument according to an embodiment of the present disclosure.

Hereinafter, an embodiment of the present disclosure will be described based on accompanying drawings. A keyboard instrument 1 shown in FIG. 1 includes keys 2 and a case 11. In the following description, a front side of the keys 2 in a front-back direction FB thereof is referred to as a front side F, and a back side of the keys 2 in the front-back direction FB thereof is referred to as a back side B. When facing the keys 2 from the front side F, a left is referred to as a left side L, and a right is referred to as a right side R. A direction LR in which the keys 2 are aligned or a key aligning direction LR is referred to as a left-right direction. In an upper-lower direction UL of the keyboard instrument 1, an upper side is referred to as an upper side Up, while a lower side is referred to as a lower side Lo. In the present embodiment, while the keyboard instrument 1 is described as an electronic piano, the present invention may be applied to any other keyboard instruments as long as they sound a note in response to a key push-down operation by a player (a user).

The keyboard instrument 1 has plural keys 2 functioning as playing operator elements for designating heights of notes and is formed into a flat plate-like shape which is long in the direction LR in which the keys 2 are aligned (the left-right direction). A control panel 12 is provided on the back side of the keys 2, and this control panel 12 includes control buttons and a dial for selecting and determining on any one in various settings. The keys 2 include white keys 21 and black keys 22. These white keys 21 and black keys 22 are aligned regularly in a predetermined order in the left-right direction of the keyboard instrument 1.

Figure 2:
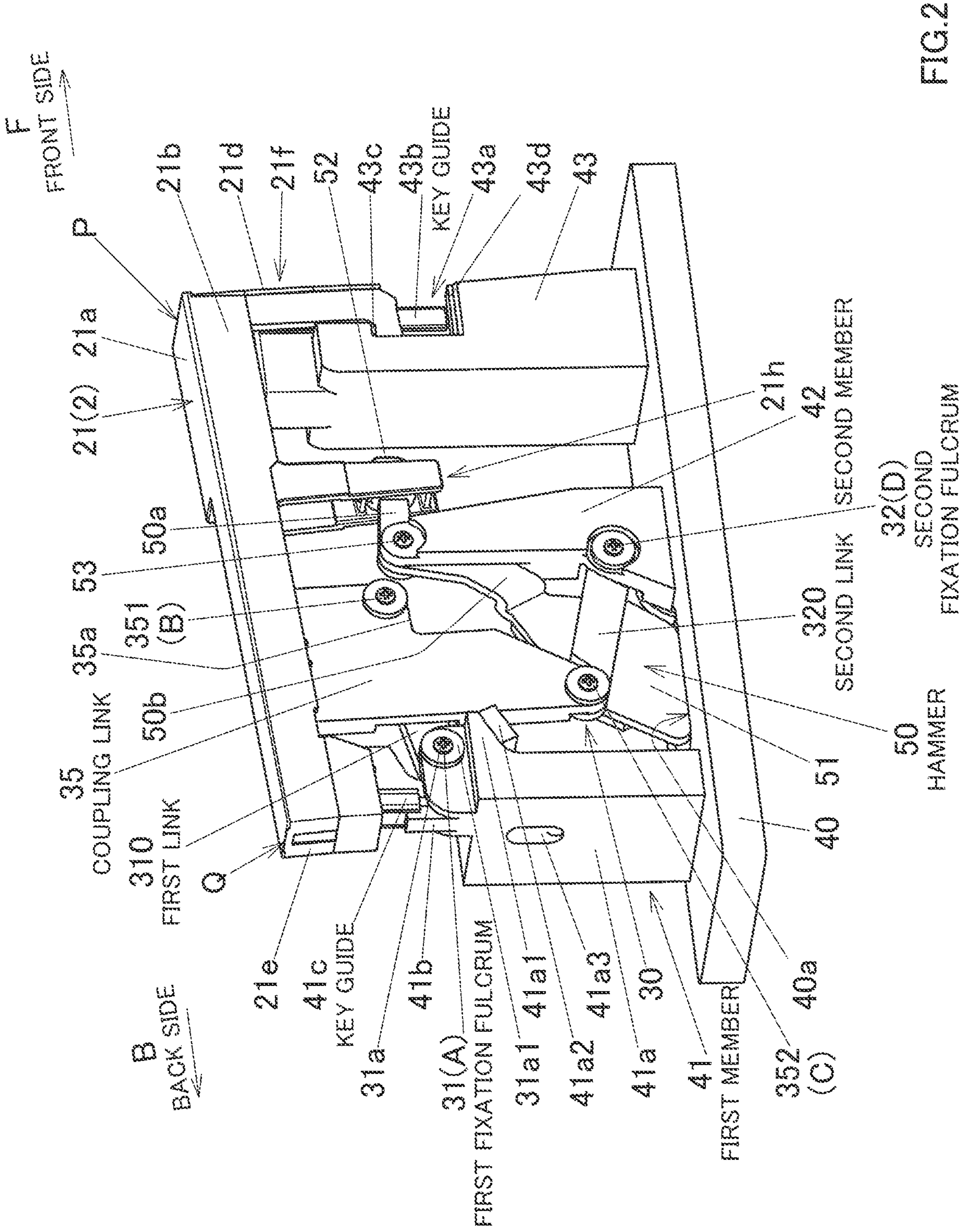
FIG. 2 is a perspective view, as viewed from a left back side, schematically showing structures of a key, which is in a steady state, a link mechanism, and the like of the keyboard instrument according to the embodiment of the present disclosure.
Figure 3:
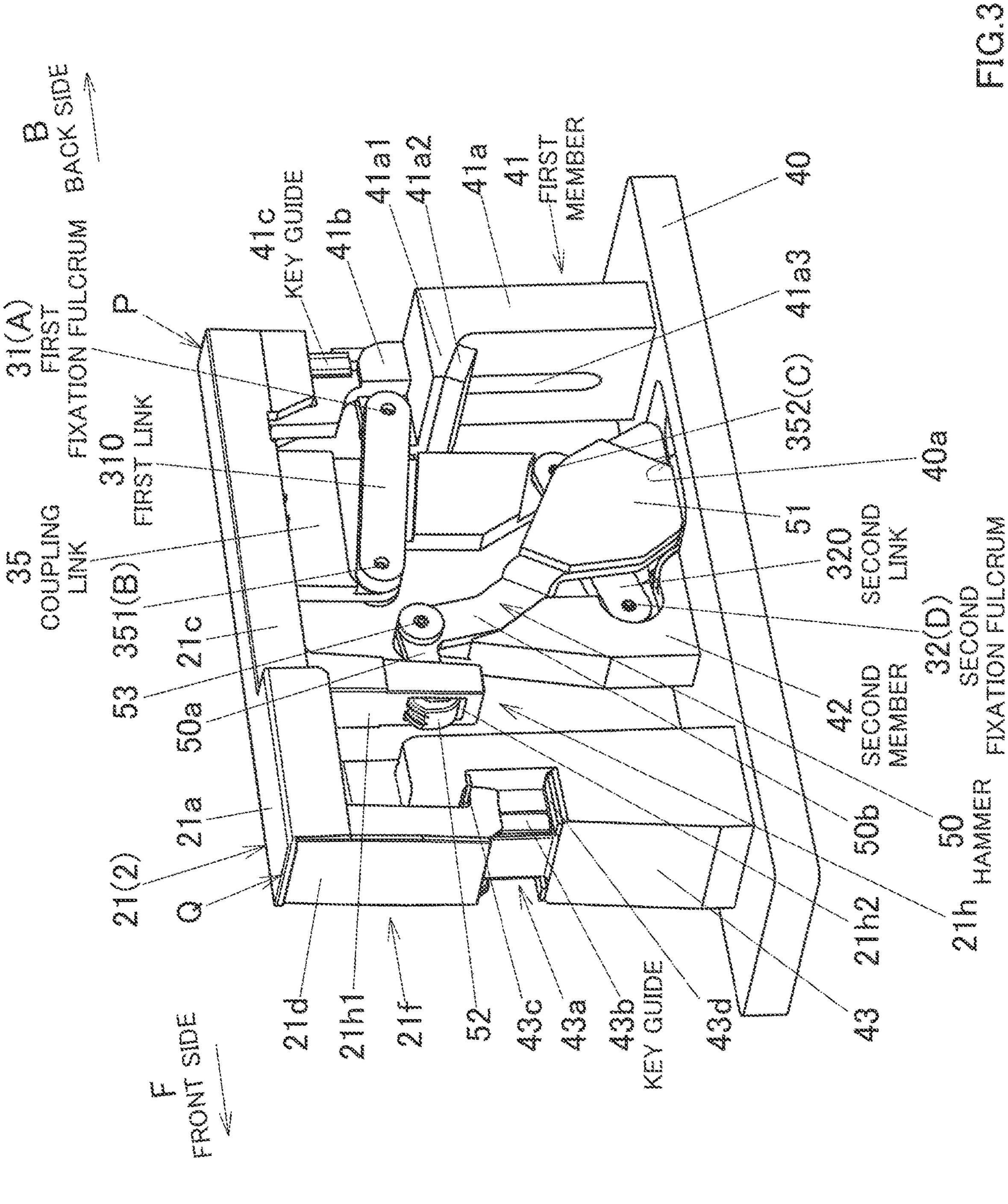
FIG. 3 is a perspective view, as viewed from a right front side, schematically showing the structures of the key in the steady state, the link mechanism, and the like of the keyboard instrument according to the embodiment of the present disclosure.
Figure 4:
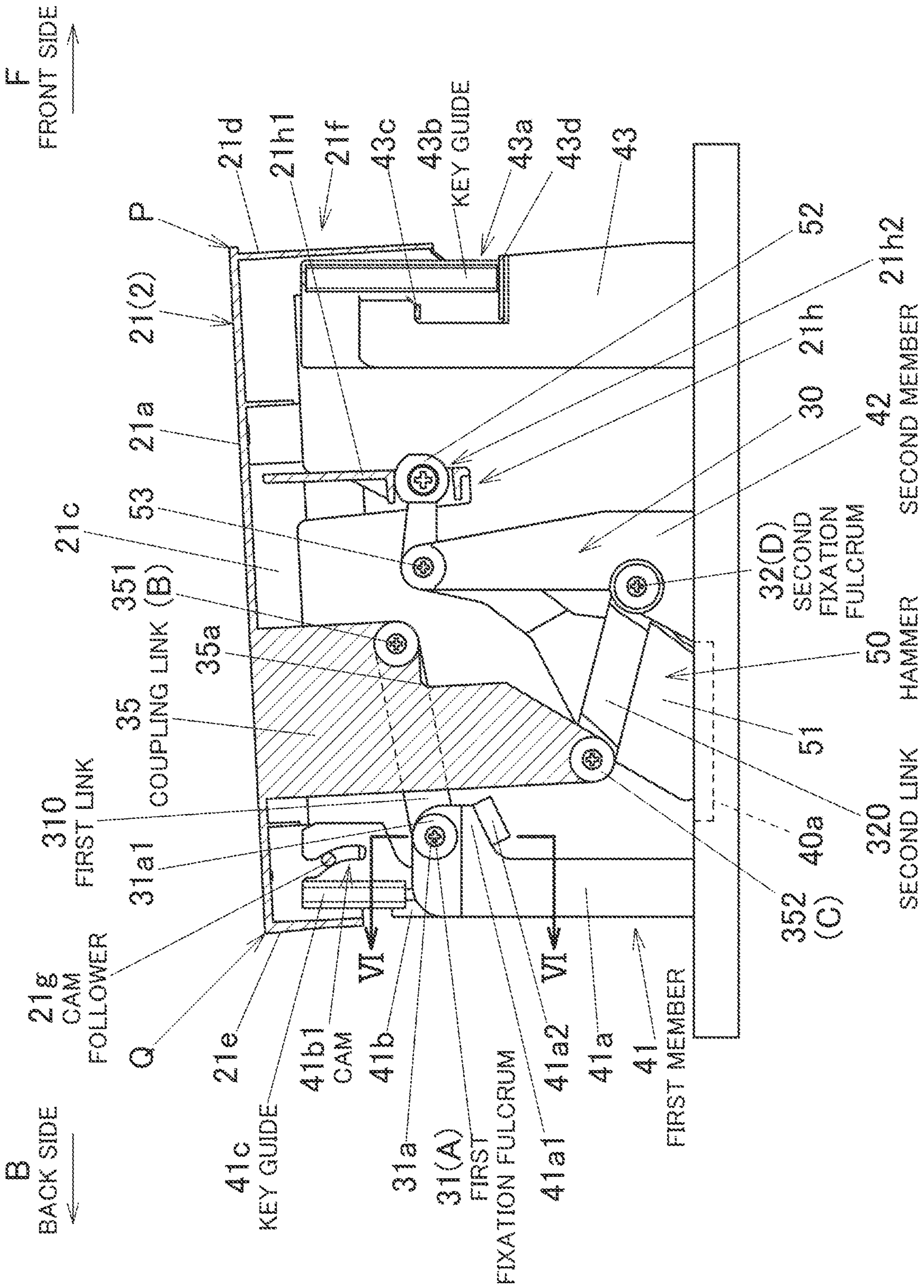
FIG. 4 is a side view, as viewed from a left-hand side, schematically showing the structures of the key in the steady state, the link mechanism, and the like of the keyboard instrument according to the embodiment of the present disclosure, with only the key shown in section.

FIGS. 2 to 5 are structure diagrams showing the structure of one white key 21 in the plural keys 2. Structures of a link mechanism 30, which is disposed on a lower side of the white key 21, a base 40 having substantially a flat plate shape, and the like which are shown in FIGS. 2 to 5 are stowed in an interior of the case 11 of the keyboard instrument 1. The plural keys 2 of the keyboard instrument 1 can obtain a dynamic characteristic which approximates to that of a grand piano by having the link mechanism 30 and the like. In FIGS. 3 and 4, only the white key 21 is shown in section. The link mechanism 30 has a first fixation fulcrum 31, a first link 310, a coupling link 35 (a first coupling 351, a second coupling 352), a second link 320, and a second fixation fulcrum 32.

As shown mainly in FIGS. 1 and 2, the white key 21 has an upper surface plate 21*a* including a surface of which most part is exposed so as to be depressed. Side plates 21*b*, 21*c*, which are aligned in the key aligning direction LR, a front plate 21*d* on the front side F, and a back plate 21*e* on the back side B are provided in such a manner as to extend towards the lower side Lo from the upper surface plate 21*a*. As a result, the white key 21 is provided substantially into a shell-like configuration. The white key 21 shown in FIGS. 2 to 5 is disposed in a position corresponding to C or F. As a result, the right-hand side plate 21*c* has substantially a hook shape, as viewed from a top thereof, so as to allow the disposition of a black key 22. Here, the white key 21 shown in FIGS. 2 to 5 is intended to represent an example of one key 2 in the keys 2 (the white keys 21, the black keys 22).

Figure 5:
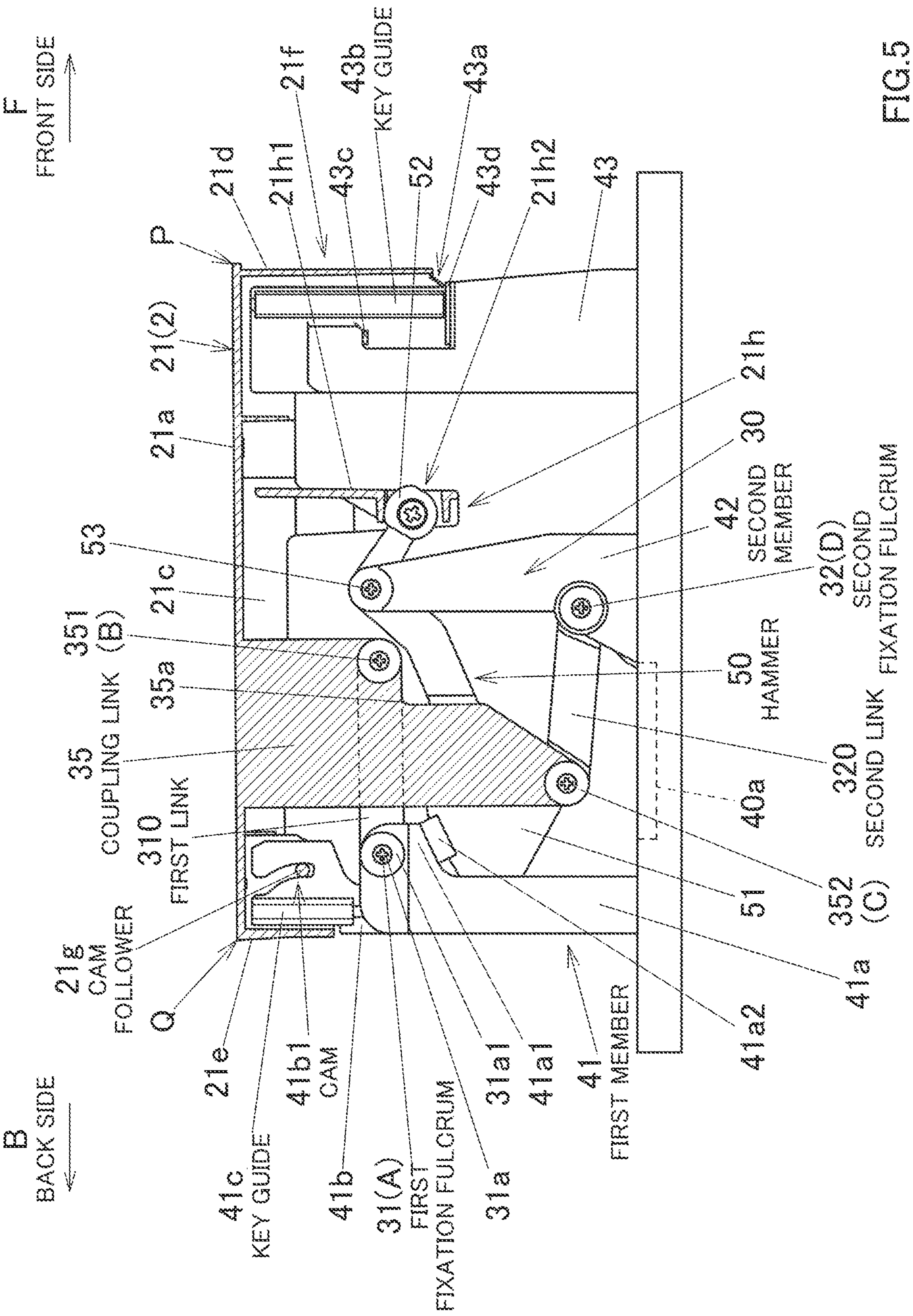
FIG. 5 is a side view, as viewed from the left-hand side, schematically showing the structures of the key, which is in a depressed state, the link mechanism, and the like of the keyboard instrument according to the embodiment of the present disclosure, with only the key shown in section.

In the front plate 21*d* and the left- and right-hand side plates 21*b*, 21*c*, a part on the front side F extends towards the lower side Lo, and a distal end portion thereof is bent to project towards the back side B, whereby a front leg 21*f* having substantially a hook shape is provided. In addition, as shown in FIGS. 4 and 5, a cylindrical cam follower 21*g*, which extends between the side plates 21*b*, 21*c*, is provided at a back side B of the white key 21. The side plates 21*b*, 21*c*, between which the cam follower 21*g* is provided, slightly extend in a direction towards the lower side Lo together with the back plate 21*e*.

Portions of the side plates 21*b*, 21*c* which lie between the front plate 21*d* and the back plate 21*e* of the white key 21 extend in the direction towards the lower side Lo so as to provide a hammer pressor 21*h*. A hammer pressor front plate 21*h*1 having a plate shape, which extends between the side plates 21*b*, 21*c* at the hammer pressor 21*h*, is provided on a front side F of the hammer pressor 21*h* between the side plates 21*b*, 21*c* which extend downwards at the hammer pressor 21*h*. The hammer pressor front plate 21*h*1 has an opening 21*h*2, which is opened in the front-back direction FB, so that a hammer cap 52, which will be described later, is inserted thereinto. Edge portions on an upper side Up and a lower side Lo of the opening 21*h*2 are bent towards the back side B so as to be positioned on an upper side Up and a lower side Lo of the hammer cap 52, respectively. A coupling link 35 is provided between the hammer pressor 21*h* and the back plate 21*e* of the white key 21. The coupling link 35 constitutes one part which makes up the link mechanism 30. Specifically speaking, the coupling link 35 is provided in such a manner as to extend from a lower surface of the upper plate 21*a* of the white key 21 towards the lower side Lo substantially into a single plate whose flat surfaces are oriented to face the left-right direction. The coupling link 35 includes a step 35*a*. The first coupling 351, functioning as a coupling, is provided in an external corner portion of the coupling link 35 which lies in the vicinity of the step 35*a*. The second coupling 352, functioning as a coupling, is provided at a distal end portion of the coupling link 35. The first coupling 351 is provided further upwards and forwards than the second coupling 352. A distance between the first coupling 351 and the second coupling 352 of the coupling link 35 which is formed into a single plate-shaped part does not change while the key is being operated.

A first member 41 is provided on an upper surface of the base 40 on a back side B thereof. The first member 41 has a prismatic support 41*a* having substantially a quadrangular prism shape and a support plate 41*b*. This support plate 41*b* is provided on an upper surface of the prismatic support 41*a* and has substantially a plate shape of which flat surface sides are oriented to face the left-right direction (the key aligning direction LR). Here, the base 40 may be a base plate of the case 11.

A front projection 41*a*1, which projects towards the front side F, is provided on an upper side Up of the prismatic support 41*a*. A lower surface of the front projection 41*a*1 inclines. An upper limit stopper 41*a*2, which has substantially a rectangular flat plate shape which is long in the left-right direction, is provided on the inclined lower surface. This upper limit stopper 41*a*2 constitutes an upper rising limit of a weight 51 of a hammer 50, which will be described later, when the weight 51 swings up. An elastic material such as felt or the like is used for the upper limit stopper 41*a*2. In addition, a vertically long groove 41*a*3 is provided in a surface on the front side F of the prismatic support 41*a* in order to avoid an interference of the hammer 50 with the prismatic support 41*a* when the hammer 50 swings up and down, as shown in FIG. 3. As shown in FIG. 2, the groove 41*a*3 penetrates the prismatic support 41*a* in the front-back direction FB in a portion on the upper side Up, whereby an elongated hole is opened in a surface on the back side B of the prismatic support 41*a*.

The support plate 41*b* of the first member 41 is provided to extend towards the upper side Up. A part of an upper side Up of the support plate 41*b* is inserted into an interior space of the white key 21 which is formed into the shell-like configuration. As shown in FIGS. 4 and 5, a cam 41*b*1 is provided on the upper side Up of the support plate 41*b*. This cam 41*b*1 is opened in an upper end side thereof and has substantially a convex arc shape which project towards the front side F in a side view. The cam follower 21*g* of the white key 21 slidably engages with the cam 41*b*1. A vertically long key guide 41*c* is provided on each of left- and right-hand surfaces of the support plate 41*b* on a back side B of the support plate 41*b*. The key guides 41*c* are brought into sliding contact with respective internal surfaces of the side plates 21*b*, 21*c* at a portion on the back side B of the white key 21 where the side plates 21*b*, 21*c* extend towards the lower side Lo. The key guides 41*c* guide a movement of the key which is activated in response to a key operation so as to prevent the white key 21 from laterally deviating in the key aligning direction LR.

Figure 6:
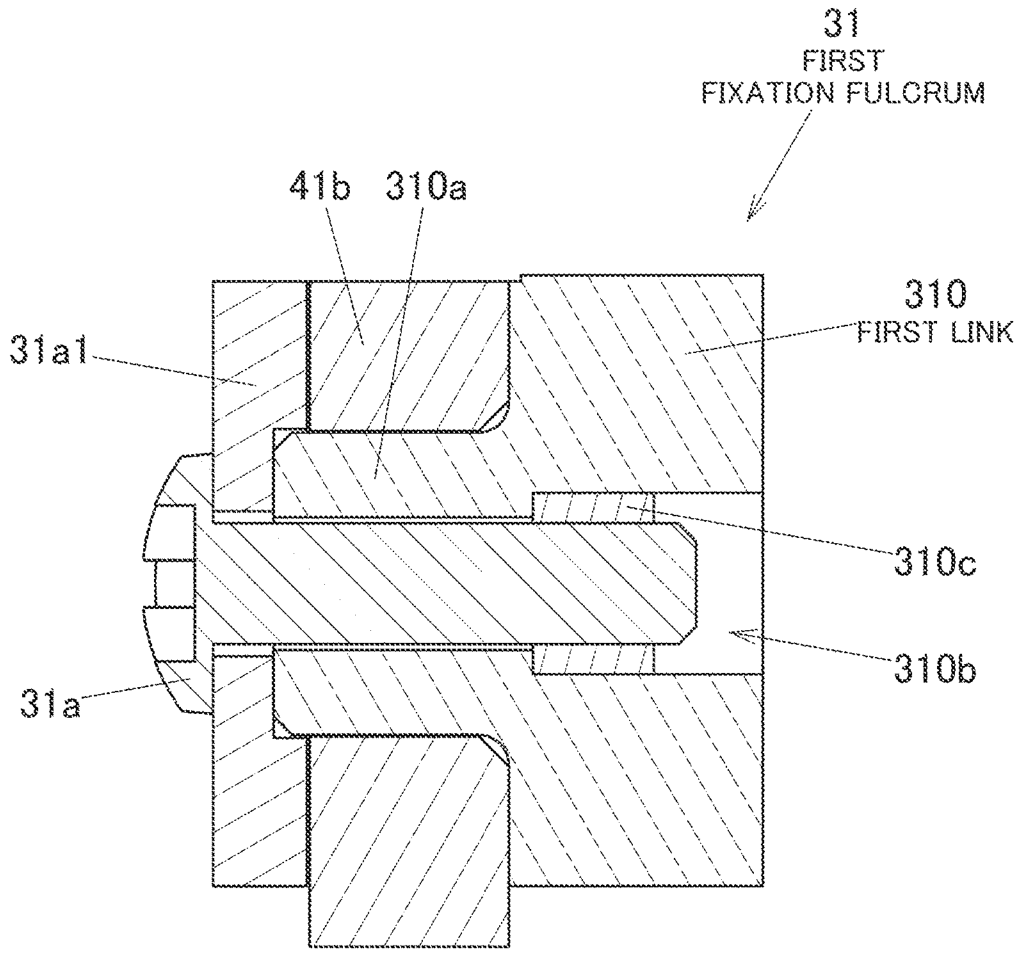
FIG. 6 is a sectional view of a first fixation fulcrum, which is taken along a line VI-VI in FIG. 4, of the keyboard instrument according to the embodiment of the present disclosure.

The first fixation fulcrum 31 of the link mechanism 30 is provided at a location which corresponds to the front projection 41*a*1 of the support plate 41*b*. One end side of the first link 310 is pivotally supported on the first fixation fulcrum 31 in such a manner as to rotate thereabout. Specifically speaking, as shown in FIG. 6, a pin 310*a* is provided at one end of the first link 310 in such a manner as to be erected therefrom, and a nut 310*c* is provided in a shaft hole 310*b* in the pin 310*a*. The pin 310*a* is inserted into a through hole provided in the support plate 41*b* to pass therethrough. When a cross recessed screw 31*a* is screwed into the nut 310*c*, a substantially central portion of a washer 31*a*1 and an end face of the pin 310*a* are bought into abutment with each other, whereby the support plate 41*b* is held between the first link 310 and the washer 31*a*1 with a predetermined clearance defined thereat. In this way, the first link 310 rotates about the pin 310*a* which functions as a shaft portion. Here, rotational structures of the rotational shafts (the first coupling 351, the second coupling 352, the second fixation fulcrum 32) of the link mechanism 30 and a fulcrum 53 of the hammer 50, which will be described below, are configured similar to the rotational structure of the first fixation fulcrum 31.

Returning to FIGS. 2 to 5, the other end side of the first link 310 is rotatably coupled to the first coupling 351 of the coupling link 35. On the other hand, a second member 42 having a prismatic shape is provided substantially at a center of the base 40 in the front-back direction FB which lies on a front side B of the first member 41 in such a manner as to be erected therefrom. The second fixation fulcrum 32 is provided on a lower side Lo of the second member 42 which faces the base 40. In other words, the second fixation fulcrum 32 is provided further forwards towards the front side F and further downwards towards the lower side Lo than the first fixation fulcrum 31. One end side of the second link 320 is pivotally supported at the second fixation fulcrum 32 in such a manner as to rotate thereabout. The other end side of the second link 320 is rotatably coupled to the second coupling 352 of the coupling link 35. The coupling link 35 fixedly couples the first link 310 and the second link 320 together so that a distance stays unchanged which is defined between the other end side of the first link 310 which rotates about the first fixation fulcrum 31 in response to the key operation and the other end side of the second link 320 which rotates about the second fixation fulcrum 32 in response to the key operation.

The fulcrum 53 of the hammer 50 is provided at an upper end of the second member 42. The hammer 50 is rotatably fixed to the fulcrum 53. That is, the second member 42 is formed as a hammer holder having the fulcrum 53 which pivotally supports the hammer 50 in such a manner as to rotate thereabout. In other words, the hammer holder is provided to be integrated with the second member 42. The hammer 50 has a connecting rod 50*a* on a front side F of the fulcrum 53 and has a connecting rod 50*b* on a back side B of the fulcrum 53. The connecting rods 50*a*, 50*b* are provided in such a manner as to be bent at the fulcrum 53. The hammer cap 52 is provided at a distal end portion of the front connecting rod 50*a*. An elastic material such as an elastomer or silicone resin is used for the hammer cap 52. The hammer cap 52, which constitutes the other end side of the hammer 50, is inserted in the opening 21*h*2 to be coupled thereto in such a manner as to be brought into sliding contact with the upper and lower hammer pressor front plates 21*h*1 which are bent in the interior of the opening 21*h*2 of the hammer pressor 21*h*.

On the other hand, the weight 51 having a wide plate shape is provided at a distal end portion of the connecting rod 50*b* (at one end side of the hammer 50) on the back side B of the hammer 50. A recess 40*a* is provided on the upper surface of the base 40 so as to avoid an interference with the weight 51 when the hammer 50 reaches a lower limit position thereof.

A front leg guide 43 having substantially a pillar shape is provided on the base 40 on a front side F of the second member 42. A recess 43*a* is provided in the front leg guide 43, and this recess 43*a* has a recessed shape in a plan view as a shape corresponding to the front leg 21*f* of the white key 21. A vertically long key guide 43*b* is provided on each of left- and right-hand side surfaces of the recess 43*a*. The key guides 43*b* are brought into sliding contact with corresponding internal surfaces of the side plates 21*b*, 21*c* of the front leg 21*f* of the white key 21. The key guides 43 are intended to prevent the white key 21 from laterally deviating in the key aligning direction LR by guiding the movement of the key in response to the operation of the key.

An upper limit stopper 43*c* and a lower limit stopper 43*d*, which are made up of an elastic material such as felt, are provided at each of left and right upper end faces and lower end faces, respectively, of the recess 43*a* of the front leg guide 43. Upper surfaces of the hook-shaped side plates 21*b*, 21*c* of the front leg 21*f* are brought into abutment with the corresponding upper stoppers 43*c* so as to prevent the white key 21 from rising further. Similarly, lower surfaces of the hook-shaped side plates 21*b*, 21*c* of the front leg 21*f* are brought into abutment with the corresponding lower limit stoppers 43*d* so as to prevent the white key 21 from lowering further.

With the white key 21 staying in a steady state shown in FIGS. 2 to 4, the weight 51 of the hammer 50 is positioned downwards due to its own weight, while the hammer cap 52, which lies opposite to the weight 51 across the fulcrum 53, is positioned upwards. As this occurs, the hammer cap 52 is brought into abutment with the hammer pressor front plate 21*h*1 of the hammer pressor 21*h* which is positioned above the hammer cap 52 to push up the hammer pressor front plate 21*h*1, and the upper surfaces of the hook-shaped side plates 21*b*, 21*c* of the front leg 21*f* are brought into abutment with the corresponding upper stoppers 43*c*. Then, when the white key 21 is pushed down, the hammer cap 52 is pushed down accordingly by the hammer pressor 21*h* (the hammer pressor front plate 21*h*1 which is in abutment with the hammer cap 52) against the own weight of the weight 51 of the hammer 50. Then, the hammer 50 rotates about the fulcrum 53, whereby the weight 51 is raised. Then, as shown in FIG. 5, the weight 51 is brought into abutment with the upper limit stopper 41*a*2, while the lower surfaces of the side plates 21*b*, 21*c* of the front leg 21*f* are brought into abutment with the corresponding lower limit stoppers 43*d*, whereupon the key push-down operation is completed.

In the key push-down operation, in the link mechanism 30, an imaginary link which couples together the first coupling 351 and the second coupling 352 of the coupling link 35 which are restrained by the first link 310 and the second link 320, respectively, moves upwards and downwards while rotating.

Although not shown, a switch for sounding a note is provided, for example, below the hammer pressor 21*h*, whereby a note can be sounded in response to the operation of the white key 21.

Loci of point P at a front end side and point Q at a back end side on an upper end face of the white key 21 can be obtained as below by reference to FIGS. 7A, 7B, 8A, 8B. Here, in description of coordinate systems shown in FIGS. 7A, 7B, 8A, 8B, the first fixation fulcrum 31 is referred to as point A, the first coupling 351 of the coupling link 35 is referred to as point B, the second coupling 352 of the coupling link 35 is referred to as point C, and the second fixation fulcrum 32 is referred to as point D. In addition, in the description, the length of the first link 310 (a length between point A and point B) is referred to as $L_1$, a length from the first coupling 351 to the second coupling 352 (a length between point B and point C) is referred to as $L_2$, and the length of the second link 320 (a length between point C and point D) is referred to as $L_3$.

Figure 7A:
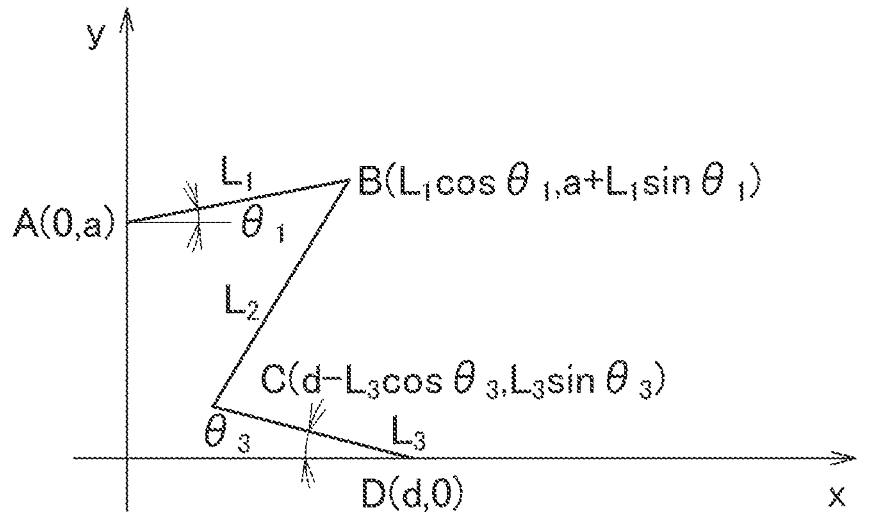

As shown in FIG. 7A, coordinates of point A and point D, which are the fixation fulcrums, are referred to as A (0, a) and D (d, 0), respectively. When an angle of the first link 310 relative to an x axis is referred to as $\theta_1$, and an angle of the second link 320 relative to the x axis is referred to as $\theta_3$, point B is represented by B ($L_1 \cos \theta_1$, $a+L_1 \sin \theta_1$), and point C is represented by C ($d-L_3 \cos \theta_3$, $L_3 \sin \theta_3$). Here, loci of point B and point C become substantially an arc shape as shown in a broken line.

Figure 7B:
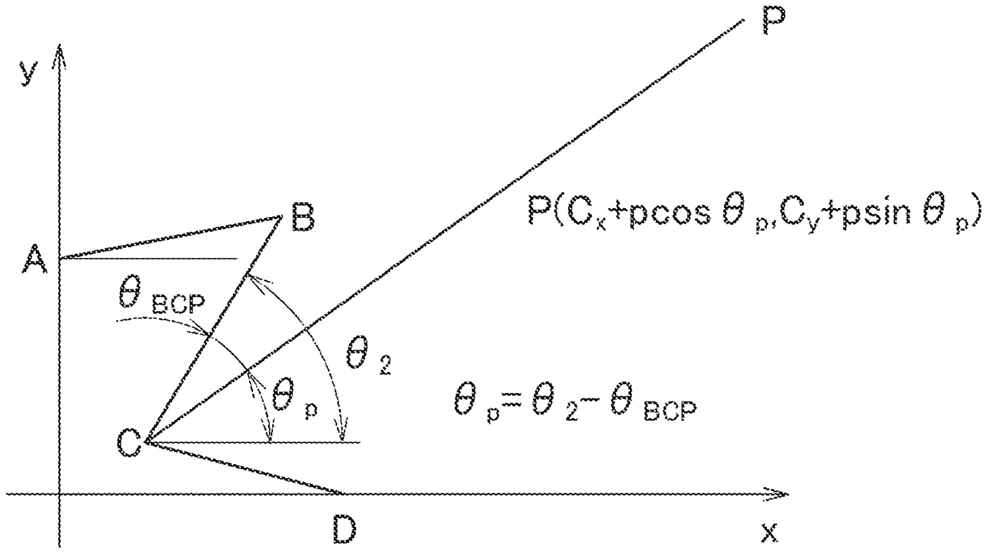

As shown in FIG. 7B, an angle formed by three points of point B, point C, and point P is referred to as $\theta_{BCP}$, an angle of a line defined between the point B and the point C relative to the x axis is referred to as $\theta_2$, and an angle of a line extending between point P and point C relative to the x axis is referred to as $\theta_p$. As this occurs, $\theta_p=\theta_2-\theta_{BCP}$. In addition, when coordinates of point C are referred to as C ($C_x$, $C_y$), and a length between point P and point C is referred to as p, then, point P is represented by P ($C_x+p \cos \theta_p$, $Cy+p \sin \theta_p$).

Figure 8A:
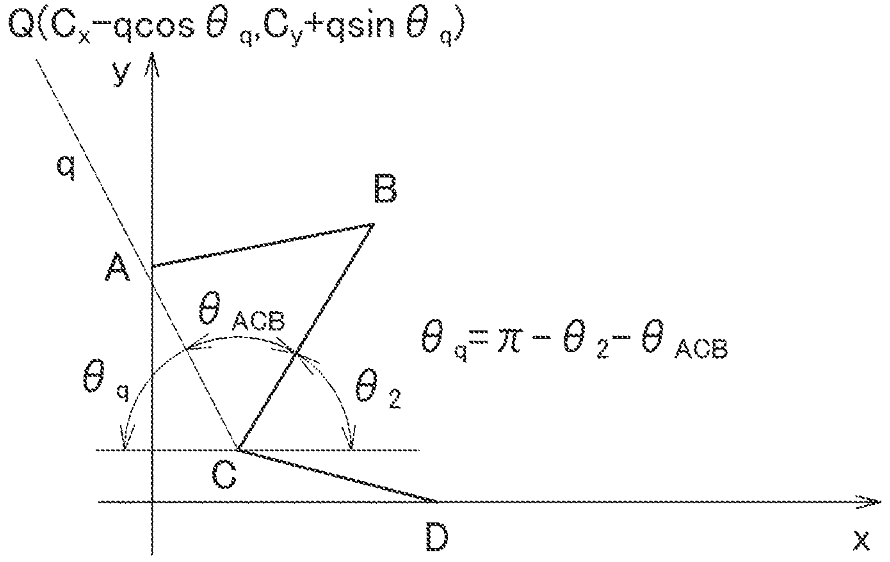

As shown in FIG. 8A, a straight line extending between point Q and point C is set to pass near point A. As a result, an angle formed by three points of point Q, point C, and point B approximates to an angle $\theta_{ABC}$ formed by three points of point A, point C, and point B. When an angle of the straight line extending between point Q and point C relative to the x axis is referred to as an angle $\theta_q$, $\theta_q=\pi-\theta_2-\theta_{ABC}$. When a length between point Q and point C is referred to as q, point Q is represented by Q ($C_x-q \cos \theta_q$, $C_y+q \sin \theta_q$).

Figure 8B:
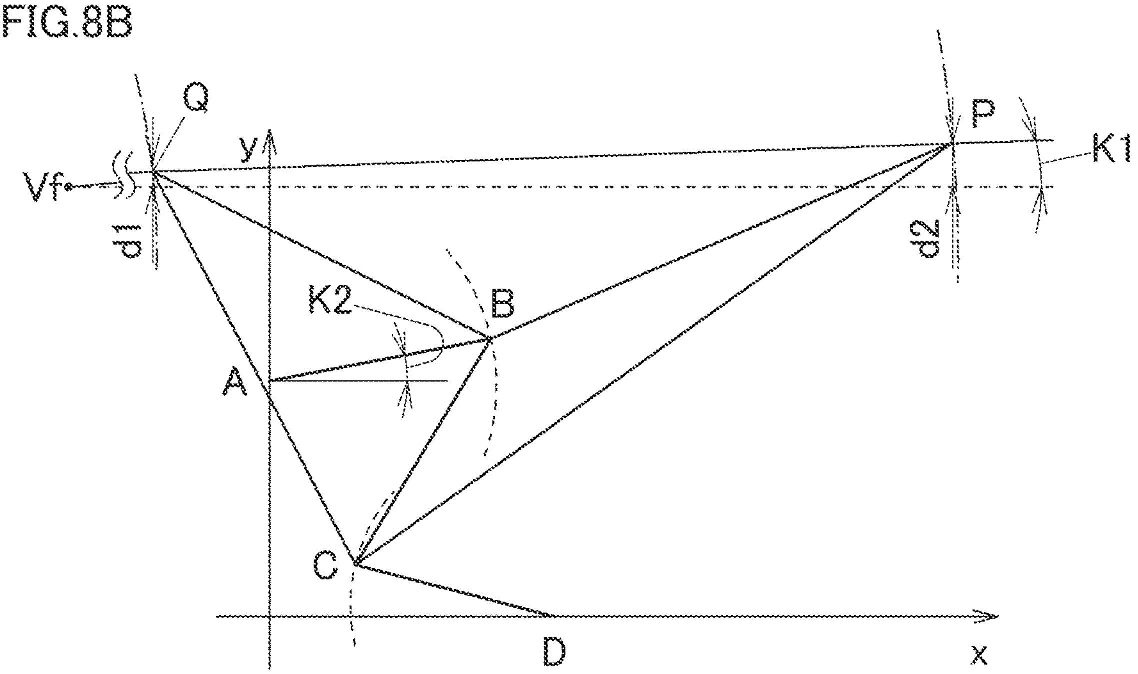

Loci of point P and point Q which are calculated as described above are represented as a displacement d1 of point Q and a displacement d2 of point P and become substantially an arc-shaped locus as indicated by alternate long and short dash lines in FIG. 8B. Here, the loci of point P and point Q become a locus of an approximate circular motion. As a result, the dynamic characteristic of the key 2 of the keyboard instrument 1, which is the small electronic piano in the present embodiment, can be made to approximate to the dynamic characteristic of a key of a grand piano by setting the length ($L_1$) of the first link 310, the length ($L_2$) of the second link 320, the length ($L_3$) defined between the first coupling 351 and the second coupling 352, and a length ($L_4$) defined from the first fixation fulcrum 31 to the second fixation fulcrum 32 so that the loci of point P and point Q match loci (displacements) of positions corresponding to point P and point Q in the grand piano.

Additionally, in order to make the dynamic characteristic of the key 2 of the keyboard instrument 1 approximate further to the dynamic characteristic of the key of the grand piano, $L_1$ (the length of the first link 310 (the length between point A and point B)), $L_2$ (the length from the first coupling 351 to the second coupling 352 (the length between point B and point C)), $L_3$ (the length of the second link 320 (the length between point C and point D)), and $L_4$ (the length from the first fixation fulcrum 31 to the second fixation fulcrum 32 (the length between point A and point D)) have the following relationship:

$$L_1>L_3, \text{ and } L_1+L_3>L_4.$$

As the result of the individual lengths being set in the relationship described above, an angle (a rotation angle K1 of the key 2, which is referred to as a second rotation angle) at point P and point Q relative to a horizontal direction (the x axis) and an angle (a rotation angle K2 of the first link 310, which is referred to as a first rotation angle) at point B relative to the horizontal direction have the following relationship:

$$K1<K2.$$

As the result of the individual angles being set in the relationship described above, a fulcrum (an imaginary fulcrum Vf) in the rotational motion of the key 2 is positioned on an extension of the line extending between point P and point Q.

Here, the problem inherent in the related art will be described. The front and back coupling link bars of the link mechanism of the conventional keyboard instrument described before are slidably coupled to each other, and this requires the link bars to have a certain length in the front-back direction. Then, there may be a case in which the lengths of the front and back link bars cause a problem when attempting to make the keyboard instrument smaller in size.

In order to solve the problem, with the embodiment of the present disclosure, the keyboard instrument 1 has the first member 41 having the first fixation fulcrum 31, the first link 310 pivotally supported on the first fixation fulcrum 31 at the one end side thereof, the second member 42 having the second fixation fulcrum 32 provided further towards the front side F and towards the lower side Lo than the first fixation fulcrum 31, the second link 320 pivotally supported on the second fixation fulcrum 32 at the one end side thereof, and the coupling link 35 configured to fix the other end side of the first link 310 which is configured to rotate about the first fixation fulcrum 31 in response to the key operation and the other end side of the second link 320 which is configured to rotate about the second fixation fulcrum 32 in response to the key operation so that the distance stays unchanged which is defined between the other end side of the first link 310 and the other end side of the second link 320.

As a result, since the dynamic characteristic of the key 2 can be set to the dynamic characteristic of the grand piano, that is, so that the imaginary rotation center is set on the extension of the line extending between point P and point Q of the key 2 (the white key 21) and the front end and the back end of the key 2 move substantially along the loci of the arc shape, the keyboard instrument 1 can be provided which includes the key 2 of which the dynamic characteristic approximates to that of the grand piano and which is formed small as a result of the use of the link mechanism 30. That is, with the configuration of the present disclosure, the small keyboard instrument can be provided in which the dynamic characteristic of the key approximates to that of the grand piano.

Additionally, the coupling (the first coupling 351) of the coupling link 35 with the first link 310 is disposed further upwards and forwards than the coupling (the second coupling 352) of the coupling link 35 with the second link 320. As a result, the key 2 can obtain the displacement and the rotation angle which approximate to those of the grand piano by setting the rotation angles and displacements of the first coupling 351 and the second coupling 352 accordingly.

The keyboard instrument 1 has the hammer 50 rotatably fixed to the fulcrum 53, having the weight 51 at the one end side, and coupled to the key 2 at the other end side. As a result, an action load equal to that of the grand piano can be imparted to the key 2 whose dynamic characteristic approximates to that of the grand piano.

The second member 42 has the fulcrum 53 configured to pivotally support the hammer 50 in such a manner as to rotate thereabout. As a result, the hammer 50 can be coupled to the lower side of the key 2.

The key guides 43*b*, 43*c* configured to guide the movement of the key 2 in response to the key operation are provided individually on the front side and the back side of the key 2. As a result, the lateral deviation of the key 2 can be reduced even when point P and point Q in the positions at the front end and the back end of the upper surface of the key 2 move substantially along the arc-shaped loci.

The length $L_1$ of the first link 310 is longer than the length $L_3$ of the second link 320, and a sum of the length $L_1$ of the first link 310 and the length $L_3$ of the second link 320 is longer than the length $L_4$ from the first fixation fulcrum 31 to the second fixation fulcrum 32 ($L_1>L_3$, and $L_1+L_3>L_4$). As a result, the first link 310, the link between the first coupling 351 and the second coupling 352, and the second link member 320 are disposed into an N shape (which is seen as a front side F thereof being oriented upwards). Thus, the keyboard instrument 1 can be made small in size.

The cam follower 21*g*, which engages with the cam 41*b*1, is provided further towards the back side B than the coupling link 35. As a result, the back end (point Q) of the key 2 which moves substantially along the arc-shaped locus can be allowed to move smoothly.

The first rotation angle K1 at which the first link 310 rotates about the first fixation fulcrum 31 in response to the key operation is larger than the second rotation angle K2 at which the key rotates about the imaginary fulcrum Vf in the up-down direction in response to the key operation. As a result, the keyboard instrument 1 can be provided which can realize the key operation in which the imaginary fulcrum Vf substantially matches that of the grand piano.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A keyboard instrument comprising:

a first member comprising a first fixation fulcrum;

a first link pivotally supported on the first fixation fulcrum at a first end side of the first link;

a second member comprising a second fixation fulcrum provided further forwards and downwards than the first fixation fulcrum with respect to a front-back direction and an upper-lower direction of the keyboard instrument;

a second link pivotally supported on the second fixation fulcrum at a first end side of the second link; and a coupling link configured to fix a second end side of the first link which is configured to rotate about the first fixation fulcrum in response to a key operation and a second end side of the second link which is configured to rotate about the second fixation fulcrum in response to the key operation so that a distance stays unchanged, the distance being a distance defined between the second end side of the first link and the second end side of the second link.

2. The keyboard instrument according to claim 1, wherein a coupling of the coupling link with the first link is disposed further upwards and forwards than a coupling of the coupling link with the second link.

3. The keyboard instrument according to claim 1, further comprising a hammer, the hammer comprising a weight at a first end side thereof and being coupled to a key at a second end side thereof.

4. The keyboard instrument according to claim 3, wherein the second member comprises a fulcrum configured to pivotally support the hammer in such that the hammer is rotatable about the fulcrum.

5. The keyboard instrument according to claim 1, further comprising a key guide configured to guide a movement of the key in response to the key operation, the key guide being provided on each of a front side and a back side of the key.

6. The keyboard instrument according to claim 1, wherein a length of the first link is longer than a length of the second link, and wherein a sum of the length of the first link and the length of the second link is longer than a length from the first fixation fulcrum to the second fixation fulcrum.

7. The keyboard instrument according to claim 1, further comprising:

a cam; and a cam follower configured to engage with the cam, wherein the cam and the cam follower are provided further backwards than the coupling link.

8. The keyboard instrument according to claim 1, wherein a first rotation angle at which the first link rotates about the first fixation fulcrum in response to the key operation is larger than a second rotation angle at which the key rotates about an imaginary fulcrum in the upper-lower direction in response to the key operation.

* * * * *